United States Patent
Kondo

(10) Patent No.: US 10,203,024 B2
(45) Date of Patent: Feb. 12, 2019

(54) DRIVE TRANSMISSION DEVICE

(71) Applicant: TOYOTA JIDOSHA KABUSHIKI KAISHA, Aichi-ken (JP)

(72) Inventor: Hiroyuki Kondo, Ama-gun (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/594,720

(22) Filed: May 15, 2017

(65) Prior Publication Data

US 2017/0356526 A1 Dec. 14, 2017

(30) Foreign Application Priority Data

Jun. 9, 2016 (JP) .................. 2016-115474

(51) Int. Cl.
*F16H 3/54* (2006.01)
*F16H 3/62* (2006.01)
(Continued)

(52) U.S. Cl.
CPC ............... *F16H 3/54* (2013.01); *F16H 3/62* (2013.01); *F16H 3/74* (2013.01); *B60K 6/365* (2013.01); *B60K 6/445* (2013.01); *F16D 7/021* (2013.01); *F16D 41/067* (2013.01); *F16H 3/66* (2013.01); *F16H 35/10* (2013.01); *F16H 37/086* (2013.01);
(Continued)

(58) Field of Classification Search
CPC ..... F16H 3/54; F16H 3/62; F16H 3/74; F16H 2003/445; F16H 2200/0034; F16H 2200/2005; F16H 2200/201; F16H 2200/2035; F16H 2200/2066; F16H 2200/2082; F16H 2200/2097; F16H 61/6648; F16H 37/086; F16H 35/10; F16H 3/66; B60K 6/364; B60K 6/445
See application file for complete search history.

(56) References Cited

U.S. PATENT DOCUMENTS 8,517,889 B2 * 8/2013 Misala ................. F16D 27/004
475/322
9,234,565 B2 * 1/2016 Zhang ....................... F16H 3/54
(Continued)

FOREIGN PATENT DOCUMENTS

JP 2008-32075 A 2/2008
JP 2008-248903 A 10/2008
(Continued)

*Primary Examiner* — Jacob S. Scott
*Assistant Examiner* — Tinh Dang
(74) *Attorney, Agent, or Firm* — Sughrue Mion, PLLC

(57) ABSTRACT

A drive transmission device includes a clutch mechanism. The clutch mechanism includes a drive transmission member that is coupled to a first rotation member via a torque limiter and is arranged in a fitting part of a second rotation member and a third rotation member, and a transmission member moving part that includes a first gap and a second gap, the first gap being formed in the fitting part and having a width wider than the thickness of the drive transmission member and the second gap being formed in the fitting part and having a width that is equal to or smaller than the thickness of the drive transmission member, the transmission member moving part being formed in such a way that the width thereof becomes smaller about a rotation axis in the fitting part.

6 Claims, 16 Drawing Sheets

(51) Int. Cl.
    *F16H 3/74*     (2006.01)
    *F16H 3/44*     (2006.01)
    *F16H 35/10*     (2006.01)
    *F16H 3/66*     (2006.01)
    *B60K 6/365*     (2007.10)
    *B60K 6/445*     (2007.10)
    *F16H 37/08*     (2006.01)
    *F16H 61/664*     (2006.01)
    *F16D 7/02*     (2006.01)
    *F16D 41/067*     (2006.01)

(52) U.S. Cl.
    CPC .... *F16H 61/6648* (2013.01); *F16H 2003/445* (2013.01); *F16H 2200/0034* (2013.01); *F16H 2200/201* (2013.01); *F16H 2200/2005* (2013.01); *F16H 2200/2035* (2013.01); *F16H 2200/2066* (2013.01); *F16H 2200/2082* (2013.01); *F16H 2200/2097* (2013.01)

(56) References Cited

U.S. PATENT DOCUMENTS

2008/0026901 A1    1/2008    Kiyosawa
2018/0170168 A1*    6/2018    Nilsson ................ B60H 1/3222

FOREIGN PATENT DOCUMENTS

| | | |
|---|---|---|
| JP | 2013-133873 A | 7/2013 |
| JP | 2013-245786 A | 12/2013 |
| JP | 2014-20445 A | 2/2014 |

* cited by examiner

DRIVE TRANSMISSION DEVICE

CROSS REFERENCE TO RELATED APPLICATIONS

This application is based upon and claims the benefit of priority from Japanese patent application No. 2016-115474, filed on Jun. 9, 2016, the disclosure of which is incorporated herein in its entirety by reference.

TECHNICAL FILED

The present invention relates to a drive transmission device.

BACKGROUND

A drive transmission device that switches, when a rotation member on an input side and a rotation member on an output side are rotated relative to each other (that is, with a difference in a rotational speed), driving systems to be input to a planet gear mechanism has been employed in joint parts and the like of tools and robots.

For example, a drive transmission device disclosed in Japanese Unexamined Patent Application Publication No. 2013-133873 includes a clutch mechanism including a steel ball, a first rotary plate and a second rotary plate, the first rotary plate including a groove part which houses a part of the steel ball, the first rotary plate being coupled to an input axis, and the second rotary plate rotatably holding the steel ball and coupled to an output axis. The groove part of the first rotary plate includes a first cam surface and a second cam surface that are inclined with respect to the direction of the rotation axis. When a load is applied to the output axis and the first rotary plate and the second rotary plate are rotated relative to each other, the steel ball rolls on the first cam surface or the second cam surface of the first rotary plate, comes out of the groove part, and pushes the second rotary plate, whereby the driving systems to be input to the planet gear mechanism are automatically switched.

SUMMARY

In the clutch mechanism in the drive transmission device disclosed in Japanese Unexamined Patent Application Publication No. 2013-133873, the steel ball rolls on the first cam surface or the second cam surface of the first rotary plate, comes out of the groove part, and pushes the second rotary plate, to thereby automatically switch the driving system to be input to the planet gear mechanism. That is, in the clutch mechanism in the drive transmission device disclosed in Japanese Unexamined Patent Application Publication No. 2013-133873, the driving system to be input to the planet gear mechanism is not switched unless the input axis and the output axis are rotated relative to each other until the steel ball has climbed the first cam surface or the second cam surface of the first rotary plate. Accordingly, there is a problem in the clutch mechanism in the drive transmission device disclosed in Japanese Unexamined Patent Application Publication No. 2013-133873 that a rotation angle error between the input axis and the output axis becomes large.

The present invention has been made in view of the aforementioned problems and provides a drive transmission device capable of suppressing the rotation angle error between the rotation member on the input side of the clutch mechanism and the rotation member on the output side of the clutch mechanism.

A drive transmission device according to one aspect of the present invention includes:
an input member to which a driving force is input;
a first rotation member coupled to the input member;
a second rotation member that is rotated about a rotation axis identical with a rotation axis about which the first rotation member is rotated;
a first clutch mechanism that switches a first driving system in which the driving force is transmitted from the second rotation member and a second driving system in which the driving force is transmitted from the first rotation member;
a third rotation member that is meshed with the first rotation member so that the third rotation member can be rotated about the rotation axis with respect to the first rotation member;
a second clutch mechanism that rotates the third rotation member freely relative to the first rotation member when the first clutch mechanism has selected the first driving system and transmits the driving force from the first rotation member to the third rotation member when the first clutch mechanism has selected the second driving system;
a planet gear mechanism including a first gear that is coupled to the second rotation member and is rotated together with the second rotation member, a second gear that is coupled to the third rotation member and is rotated together with the third rotation member, and a third gear that has been fixed; and
an output member that outputs a driving force output from the planet gear mechanism, in which
the second clutch mechanism includes:
a drive transmission member that is coupled to the second rotation member via a torque limiter and is arranged in a fitting part of the first rotation member with the third rotation member; and
a transmission member moving part that includes a first gap and a second gap, the first gap being formed in a radial direction about the rotation axis in the fitting part and having a width in the radial direction wider than the thickness of the drive transmission member and the second gap being formed in the radial direction about the rotation axis in the fitting part and having a width in the radial direction equal to or smaller than the thickness of the drive transmission member, the transmission member moving part being formed in such a way that the width thereof becomes smaller from the first gap to the second gap around the rotation axis in the fitting part,
when the first clutch mechanism has selected the first driving system, the drive transmission member is arranged in the first gap and the third rotation member to which the driving force is transmitted via the first gear and the second gear is rotated freely relative to the first rotation member and the drive transmission member is rotated together with the second rotation member via the torque limiter so that the first rotation member and the second rotation member are rotated in the same manner, and
when the driving system has been switched from the first driving system to the second driving system due to an operation by the first clutch mechanism, the first rotation member and the second rotation member are rotated relative to each other, the drive transmission member is moved from the first gap toward the second gap to cause the drive transmission member to be meshed between the first rotation member and the third rotation member and the torque limiter cancels a coupling state between the drive transmission member and the second rotation member while transmitting the driving force from the first rotation member to the third rotation member.

In the aforementioned drive transmission device, the drive transmission member may include:

a roller that is extended in a direction of the rotation axis; and a holder that rotatably holds the roller and is coupled to the second rotation member via the torque limiter, an end part of the first rotation member may be meshed with a recessed part formed in an end part of the third rotation member, an outer shape of the end part of the first rotation member may be a polygonal shape, an inner shape of the recessed part of the third rotation member may be a circular shape, the first gap is a gap between a predetermined position between one corner part of an outer peripheral surface in the end part of the first rotation member and another corner part thereof and an inner peripheral surface of the recessed part in the third rotation member and has a width in the radial direction larger than the diameter of the roller, and when the first clutch mechanism has selected the first driving system, the roller may be arranged in the first gap, and the second gap is a gap between a predetermined position around a corner part of the outer peripheral surface in the end part of the first rotation member and the inner peripheral surface of the recessed part in the third rotation member and has a width in the radial direction equal to or smaller than the diameter of the roller, and when the first clutch mechanism has switched the first driving system to the second driving system, the roller may be moved toward the second gap in such a way that the roller approaches the corner part in the end part of the first rotation member.

In the aforementioned drive transmission device, the holder may have a cylindrical shape and the first rotation member is inserted into the holder, and when the roller is meshed with the outer peripheral surface of the end part of the first rotation member and the inner peripheral surface of the recessed part of the third rotation member and the first gear is rotated via the second gear, the holder may be meshed with the second rotation member in such a way that the holder is rotated freely relative to the second rotation member.

In the aforementioned drive transmission device, the drive transmission member may include:

a roller that is extended in a direction of the rotation axis; and a holder that rotatably holds the roller and is coupled to the second rotation member via the torque limiter, an end part of the third rotation member may be meshed with a recessed part formed in an end part of the first rotation member, an inner shape of the recessed part of the first rotation member may be a polygonal shape, an outer shape of the end part of the third rotation member may be a circular shape, the first gap is a gap between a predetermined position around a corner part of an inner peripheral surface in the recessed part of the first rotation member and an outer peripheral surface in the end part of the third rotation member and has a width in the radial direction larger than the diameter of the roller, and when the first clutch mechanism has selected the first driving system, the roller may be arranged in the first gap, and the second gap is a gap between a predetermined position between one corner part of the inner peripheral surface in the recessed part of the first rotation member and another corner part thereof and the outer peripheral surface in the end part of the third rotation member and has a width in the radial direction equal to or smaller than the diameter of the roller, and when the first clutch mechanism has switched the first driving system to the second driving system, the roller may be moved toward the second gap in such a way that the roller approaches an area between one corner part of the inner peripheral surface in the recessed part of the first rotation member and the other corner part thereof.

In the aforementioned drive transmission device, the holder may have a cylindrical shape and the third rotation member is inserted into the holder, and when the roller is meshed with the inner peripheral surface of the recessed part of the first rotation member and the outer peripheral surface of the end part of the third rotation member and the first gear is rotated via the second gear, the holder may be meshed with the second rotation member in such a way that the holder is rotated freely relative to the second rotation member.

In the aforementioned drive transmission device, the planet gear mechanism may include a fourth gear, the first gear may be a planet gear, the second gear may be a sun gear meshed with the first gear, the third gear may be a fixed ring gear that is meshed with the first gear, and the fourth gear may be a ring gear that is meshed with the first gear and is coupled to the output member, the number of teeth of the fourth gear being different from that of the third gear.

The above and other objects, features and advantages of the present invention will become more fully understood from the detailed description given hereinbelow and the accompanying drawings which are given by way of illustration only, and thus are not to be considered as limiting the present invention.

DESCRIPTION OF EMBODIMENTS

In the following description, with reference to the drawings, specific embodiments to which the present invention is applied will be described in detail. However, the present invention is not limited to the following embodiments. Further, for the sake of clarity of the description, the following description and the drawings will be simplified as appropriate.

First Embodiment

Figure 1:
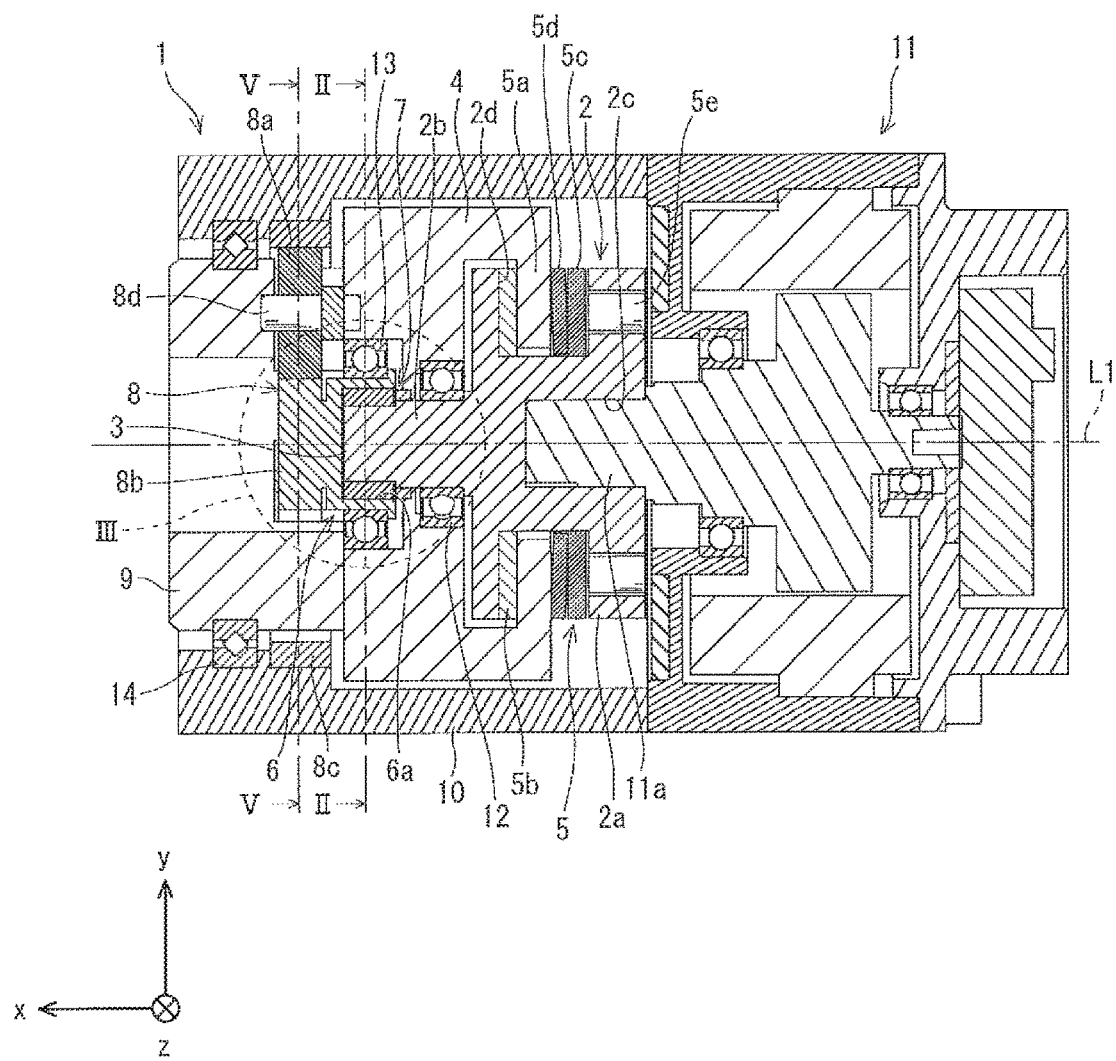
FIG. 1 is a cross-sectional view schematically showing a drive transmission device according to a first embodiment.
Figure 2:
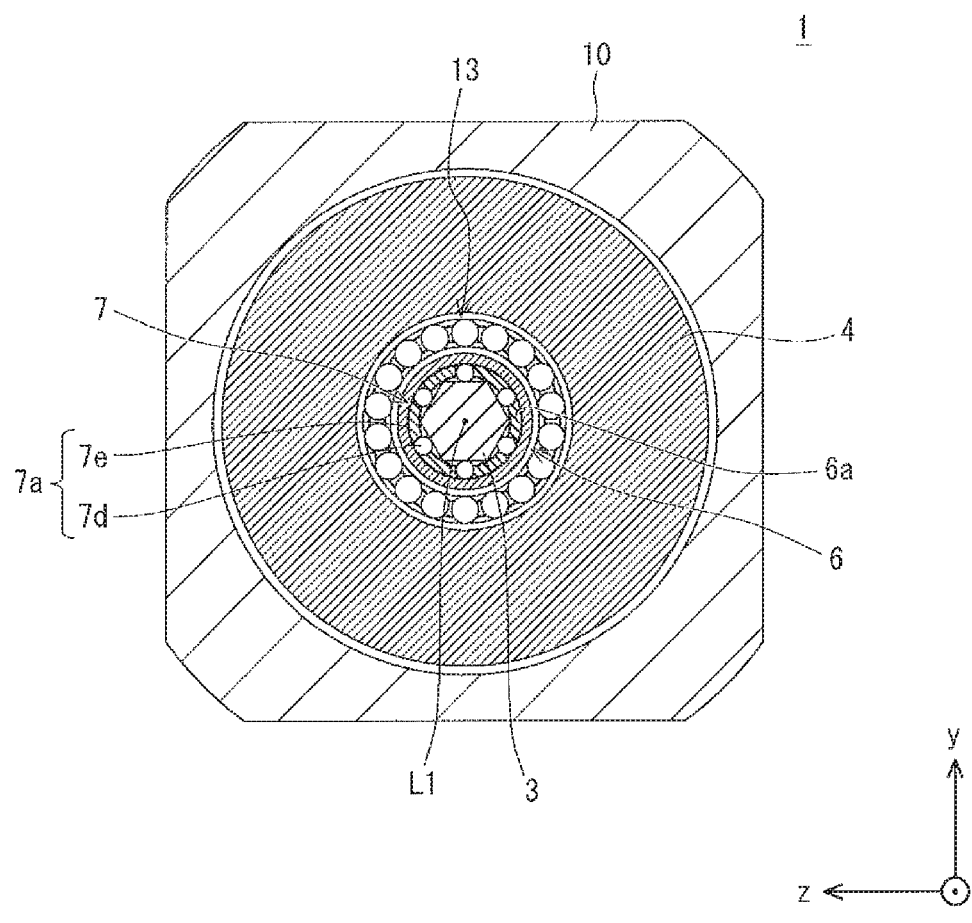
FIG. 2 is a cross-sectional view taken along the line II-II of FIG. 1.
Figure 3:
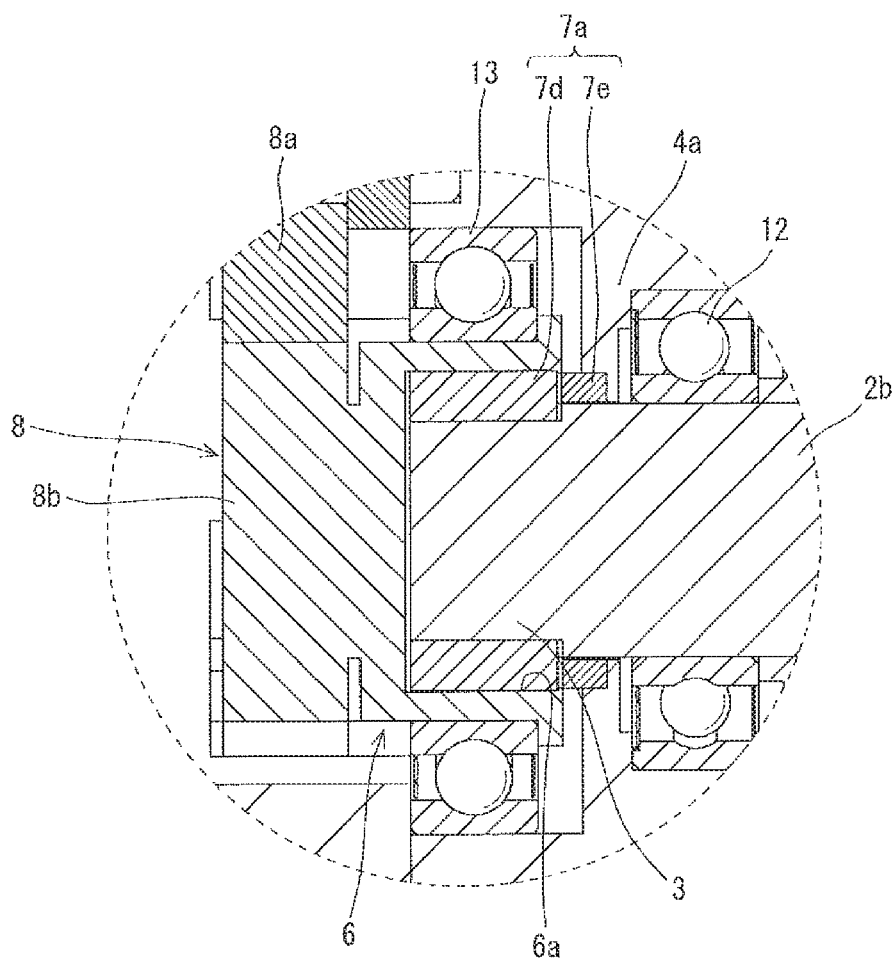
FIG. 3 is an enlarged view of the part III of FIG. 1.
Figure 4:
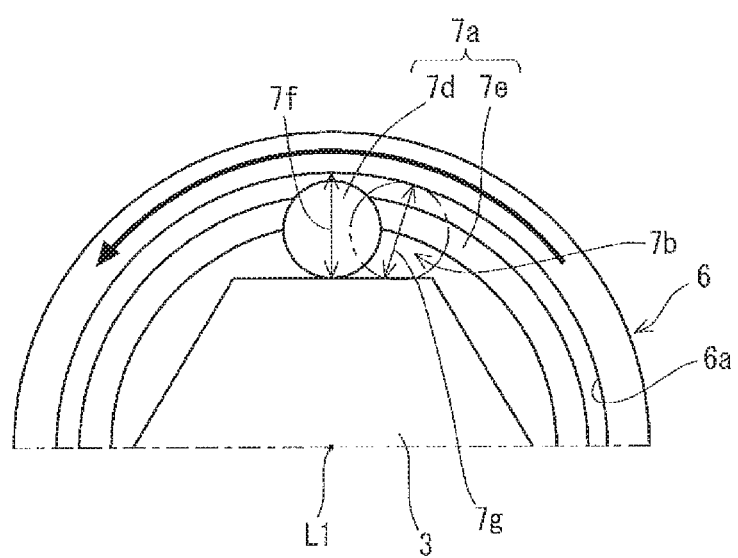
FIG. 4 is a diagram schematically showing arrangement of a roller of a second clutch mechanism when an input member and an output member in the drive transmission device according to the first embodiment are rotated at the same speed.
Figure 5:
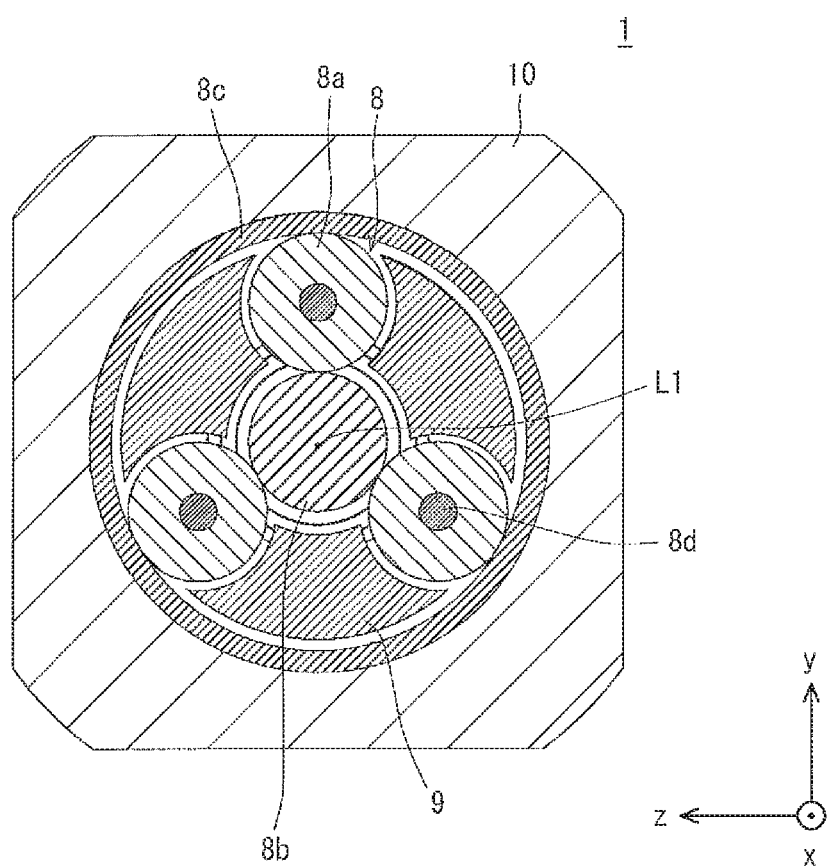
FIG. 5 is a cross-sectional view taken along the line V-V of FIG. 1.

A drive transmission device according to this embodiment will be described. First, a structure of the drive transmission device according to this embodiment will be described. FIG. 1 is a cross-sectional view schematically showing the drive transmission device according to this embodiment. FIG. 2 is a cross-sectional view taken along the line II-II of FIG. 1. FIG. 3 is an enlarged view of the Part III of FIG. 1. FIG. 4 is a diagram schematically showing arrangement of a roller of a second clutch mechanic when an input member and an output member in the drive transmission device according to this embodiment are rotated at the same speed. FIG. 5 is a cross-sectional view taken along the line V-V of FIG. 1. In the following description, for the sake of clarity of the description, descriptions will be given using orthogonal coordinate (xyz coordinate) systems.

A drive transmission device 1 according to this embodiment is configured in such a way that a first driving system in which the input member and the output member are rotated at the same speed is automatically switched to a second driving system in which the output member is rotated at a speed lower than the rotational speed of the input member when a load is applied to the output member.

The drive transmission device 1 includes, as shown in FIG. 1, an input member 2, a first rotation member 3, a second rotation member 4, a first clutch mechanism 5, a third rotation member 6, a second clutch mechanism 7, a planet gear mechanism 8, an output member 9, and a housing 10.

A driving force is, for example, transmitted to the input member 2 from a rotor shaft 11a of a motor 11. The input member 2 includes, for example, a base part 2a and a protruding part 2b. The basic form of the base part 2a is a columnar shape and a recessed part 2c with which the rotor shaft 11a of the motor 11 is meshed is formed on the surface of the base part 2a on the negative side of the x axis.

In the state in which the rotor shaft 11a of the motor 11 is meshed with the recessed part 2c, the driving force can be transmitted from the motor 11 to the input member 2 and the input member 2 can be slid in the x-axis direction with respect to the rotor shaft 11a of the motor 11. In this way, in the state in which the rotor shaft 11a of the motor 11 is meshed with the recessed part 2c, the center axis of the base part 2a and the center axis of the rotor shaft 11a of the motor 11 are arranged on a rotation axis L1. A recessed part 2d that is continuous in the circumferential direction is formed on the outer peripheral surface of the base part 2a. The protruding part 2b is protruded in the positive direction of the x axis from the surface on the base part 2a which is on the positive side of the x axis. The protruding part 2b has a columnar shape having a diameter smaller than that of the base part 2a and the center axis of the protruding part 2b is arranged on the rotation axis L1. That is, the center axis of the base part 2a and the center axis of the protruding part 2b are arranged on the rotation axis L1. In this embodiment, the rotor shaft 11a of the motor 11 is meshed with the recessed part 2c of the input member 2, whereby the driving force of the motor 11 is transmitted to the input member 2. Alternatively, the driving force of the motor 11 may be transmitted to the input member 2, for example, via a gear or a belt. Further, the center axis of the rotor shaft 11a of the motor 11 may not be arranged on the rotation axis L1.

The first rotation member 3 is coupled to the input member 2 and is rotated about the rotation axis L1. The first rotation member 3 is, for example, as shown in FIG. 1, protruded in the positive direction of the x axis from the end part of the protruding part 2b of the input member 2 on the positive side of the x axis and is integrally formed with the input member 2. The first rotation member 3 is formed into a polygonal column shape (while the first rotation member 3 is formed into a regular hexagonal column shape in this embodiment, the number of corner parts and so on are not limited), as shown in FIG. 2. That is, when the first rotation member 3 is seen from the x-axis direction, the first rotation member 3 has a polygonal shape.

The second rotation member 4 is rotated about the rotation axis L1. The basic form of the second rotation member 4 is, for example, as shown in FIGS. 1 and 2, a cylindrical shape and an end part of the base part 2a of the input member 2 on the positive side of the x axis, the protruding part 2b of the input member 2, and the first rotation member 3 are inserted into the second rotation member 4. As will be described later, the second rotation member 4 is coupled to the planet gear mechanism 8 and the movement of the second rotation member 4 in the x-axis direction is substantially restrained. Further, the second rotation member 4 is supported on the protruding part 2b of the input member 2 via a bearing 12. The bearing 12 is configured to allow the movement of the input member 2 in the x-axis direction with respect to the second rotation member 4.

While specific operations will be described later, the first clutch mechanism 5 switches the first driving system and the second driving system. The first clutch mechanism 5 includes, for example, a reaction plate 5a, a friction plate 5b, a pressing plate 5c, an elastic body 5d, and an adjusting member 5e and when the driving force equal to or larger than a predetermined first driving force is transmitted from the second rotation member 4 to the first rotation member 3, switches the first driving system to the second driving system. When the first driving system has been selected, the first clutch mechanism 5 transmits, from the second rotation member 4, the driving force input from the input member 2. When the second driving system has been selected, the first clutch mechanism 5 transmits, from the first rotation member 3, the driving force input from the input member 2.

The reaction plate 5a is protruded from an end part of the inner peripheral surface of the second rotation member 4 on the negative side of the x axis to the side of the rotation axis L1 and is arranged in the recessed part 2d of the input member 2. The friction plate 5b is, for example, arranged in the space on the positive side of the x axis in the recessed part 2d of the input member 2 with the reaction plate 5a interposed therebetween. The surface of the friction plate 5b on the positive side of the x axis contacts a side surface of the recessed part 2d of the input member 2 and the surface of the friction plate 5b on the negative side of the x axis contacts the reaction plate 5a.

The pressing plate 5c is arranged in the space of the negative side of the x axis in the recessed part 2d of the base part 2a of the input member 2 with the reaction plate 5a interposed therebetween. The elastic body 5d is arranged between the reaction plate 5a and the pressing plate 5c. An end part of the elastic body 5d on the positive side of the x axis contacts the reaction plate 5a and an end part of the elastic body 5d on the negative side of the x axis contacts the pressing plate 5c.

The adjusting member 5e adjusts the position of the input member 2 in the x-axis direction. The adjusting member 5e is, for example, a screw member extending in the x-axis direction and is screwed into the base part 2a of the input member 2 so that the tip of the adjusting member 5e contacts the pressing plate 5c.

When the adjusting member 5e is rotated in such a way that the tip of the adjusting member 5e is moved in the positive direction of the x axis, the elastic body 5d that is pressed by the pressing plate 5c is contracted between the reaction plate 5a and the pressing plate 5c and moves the input member 2 in the negative direction of the x axis via the pressing plate 5c by the reactive force by the reaction plate 5a. This results in an increase in the frictional force between the side surface of the recessed part 2d of the input member 2 and the friction plate 5b and an increase in the frictional force between the friction plate 5b and the reaction plate 5a provided in the second rotation member 4.

On the other hand, when the adjusting member 5e is rotated in such a way that the tip of the adjusting member 5e is moved in the negative direction of the x axis, the pressing plate 5c is moved in the negative direction of the x axis and the compressive force of the elastic body 5d is reduced, which reduces the frictional force between the side surface of the recessed part 2d of the input member 2 and the friction plate 5b and the frictional force between the friction plate 5b and the reaction plate 5a provided in the second rotation member 4.

As described above, by adjusting the position of the tip of the adjusting member 5e in the x-axis direction and adjusting the frictional force between the side surface of the recessed part 2d of the input member 2 and the friction plate 5b and the frictional force between the friction plate 5b and the reaction plate 5a provided in the second rotation member 4, the first driving force can be adjusted.

Alternatively, the frictional force between the side surface of the recessed part 2d of the input member 2 and the friction plate 5b and the frictional force between the friction plate 5b and the reaction plate 5a provided in the second rotation member 4 may be adjusted by omitting the adjusting member 5e and changing the thickness of the pressing plate 5c.

The third rotation member 6 is, as shown in FIGS. 1 and 3, meshed with the first rotation member 3 in such a way that it is rotatable about the rotation axis L1 with respect to the first rotation member 3. The basic form of the third rotation member 6 is, for example, a columnar shape and a recessed part 6a that is extended in the positive direction of the x axis from the surface on the negative side of the x axis is formed. The recessed part 6a has a circular shape when it is seen from the x-axis direction and the first rotation member 3 is inserted into the recessed part 6a. The third rotation member 6 is inserted into the second rotation member 4 and is supported by the second rotation member 4 via the bearing 13.

Although specific operations of the second clutch mechanism 7 will be described later, when the first clutch mechanism 5 has selected the first driving system, the second clutch mechanism 7 rotates the third rotation member 6 freely relative to the first rotation member 3. On the other hand, when the first clutch mechanism 5 has selected the second driving system, the second clutch mechanism 7 transmits the driving force from the first rotation member 3 to the third rotation member 6.

Specifically, the second clutch mechanism 7 includes, as shown in FIGS. 2 to 4, a drive transmission member 7a and a transmission member moving part 7b. The drive transmission member 7a is arranged between the outer peripheral surface of the first rotation member 3 and the inner peripheral surface of the recessed part 6a of the third rotation member 6. The drive transmission member 7a includes, for example, a roller 7d and a holder 7e.

The roller 7d is a columnar member that is extended in the x-axis direction and is arranged between the outer peripheral surface of the first rotation member 3 and the inner peripheral surface of the recessed part 6a of the third rotation member 6. The roller 7d is arranged, for example, in each of the sides of the polygon of the first rotation member 3. The arrangement and the number of rollers 7d are not, however, limited.

The holder 7e rotatably holds the roller 7d and is arranged between the outer peripheral surface of the first rotation member 3 and the inner peripheral surface of the recessed part 6a of the third rotation member 6 together with the roller 7d. The basic form of the holder 7e is, for example, a cylindrical shape and the first rotation member 3 is inserted into the holder 7e. The end part of the holder 7e on the negative side of the x axis is meshed with the protruding part 4a that is protruded from the inner peripheral surface of the second rotation member 4 toward the rotation axis L1, and when the driving force which is equal to or larger than a predetermined second driving force is transmitted from the planet gear mechanism 8 to the holder 7e, the holder 7e is rotated substantially freely relative to the second rotation member 4. That is, the fitting part of the second rotation member 4 with the holder 7e serves as a torque limiter. While the torque limiter is constituted of the fitting part of the second rotation member 4 and the holder 7e in this embodiment, the holder 7e may be coupled to the second rotation member 4 via a known torque limiter.

The transmission member moving part 7b is a gap formed between the outer peripheral surface of the first rotation member 3 and the inner peripheral surface of the recessed part 6a of the third rotation member 6 (that is, the fitting part) in the radial direction about the rotation axis L1 and the width of the transmission member moving part 7b becomes continuously narrower about the rotation axis L1. The transmission member moving part 7b includes a first gap 7f and a second gap 7g. While the width of the transmission member moving part 7b in this embodiment becomes continuously narrower about the rotation axis L1, it may become narrower intermittently or partially.

The first gap 7f has a width in the radial direction about the rotation axis L1 wider than the diameter (that is, the thickness) of the roller 7d. The first gap 7f is a gap formed between, for example, a predetermined position between a corner part of the outer peripheral surface of the first rotation member 3 and another corner part thereof (in this embodiment, in the vicinity of the center) and the inner peripheral surface of the recessed part 6a of the third rotation member 6.

The second gap 7g is continuous with the first gap 7f about the rotation axis L1 and has a width in the radial direction about the rotation axis L1 equal to or smaller than the diameter of the roller 7d. The second gap 7g is, for example, a gap between a predetermined position around a corner part of the outer peripheral surface of the first rotation member 3 (in this embodiment, in the vicinity of the corner part) and the inner peripheral surface of the recessed part 6a of the third rotation member 6.

The planet gear mechanism 8 is, as shown in FIGS. 1 and 5, a first gear 8a, a second gear 8b, and a third gear 8c and is configured to be able to serve as a so-called planetary-type planet gear mechanism.

The first gear 8a is, for example, a planet gear and a plurality of (in this embodiment, three, but the number thereof is not particularly limited) first gears 8a are arranged with a predetermined interval about the rotation axis L1. The first gear 8a is rotatably coupled to the second rotation member 4 via a supporting axis 8d that is protruded in the positive direction of the x axis from the surface on the positive side of the x axis in the second rotation member 4. Accordingly, the first gear 8a is revolved about the rotation axis L1 in association with the rotation of the second rotation member 4.

The second gear 8b is, for example, a sun gear and is rotated about the rotation axis L1. An end part of the second gear 8b on the negative side of the x axis is coupled to an end part of the third rotation member 6 on the positive side of the x axis and the second gear 8b is rotated together with the third rotation member 6. The first gear 8a is meshed with the second gear 8b.

The third gear 8c is a ring-shaped inner gear (a ring gear) and is fixed to the housing 10. The first gear 8a is meshed with the third gear 8c.

The output member 9 outputs the driving force output from the planet gear mechanism 8. The output member 9 is coupled, for example, to the second rotation member 4 via the supporting axis 8d and is rotated about the rotation axis L1. This output member 9 is supported in the housing 10 via the bearing 14.

The housing 10 houses the input member 2, the first rotation member 3, the second rotation member 4, the first clutch mechanism 5, the third rotation member 6, the second clutch mechanism 7, the planet gear mechanism 8, and the output member 9.

Figure 6:
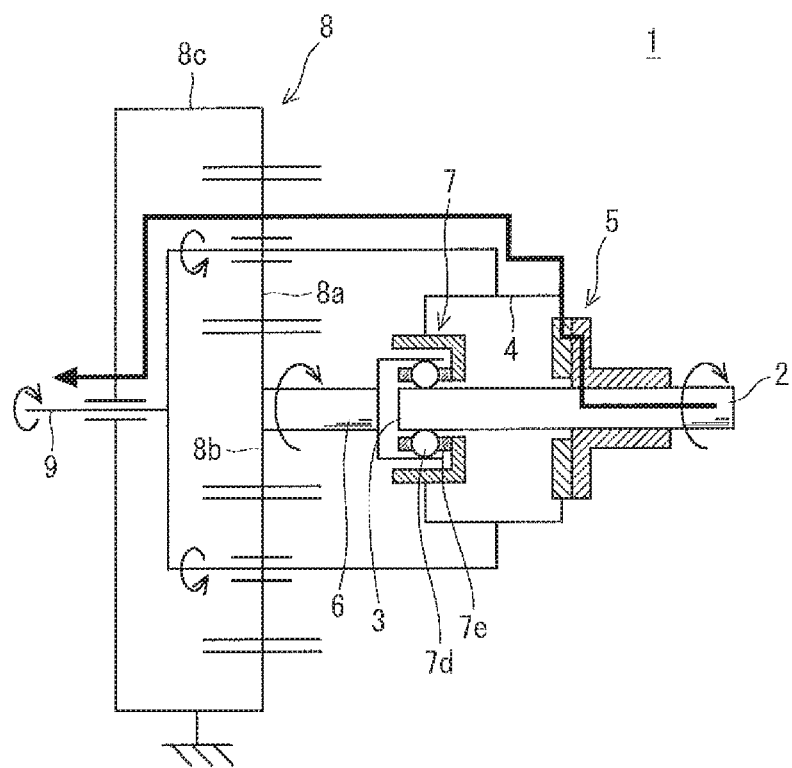
FIG. 6 is a skeleton diagram showing a first driving system in which the input member and the output member in the drive transmission device according to the first embodiment are rotated at the same speed.

Next, operations of the drive transmission device according to this embodiment will be described. First, operations of the drive transmission device 1 in a case in which the input member 2 and the output member 9 are rotated at the same speed will be described. FIG. 6 is a skeleton diagram showing the first driving system in which the input member and the output member in the drive transmission device according to this embodiment are rotated at the same speed. In FIG. 6, the first driving system is indicated by an arrow.

When a load is hardly applied to the output member 9 and the driving force transmitted from the second rotation member 4 to the first rotation member 3 is smaller than the predetermined first driving force, the side surface of the recessed part 2d of the input member 2 and the friction plate 5b, and the friction plate 5b and the reaction plate 5a provided in the second rotation member 4 hardly slide and the driving force is transmitted from the input member 2 to the second rotation member 4 via the friction plate 5b, which causes the second rotation member 4 to be rotated.

As described above, when the load is hardly applied to the output member 9, as shown in FIG. 6, the first clutch mechanism 5 selects the first driving system in which the driving force is transmitted from the second rotation member 4. In this case, the first rotation member 3 coupled to the input member 2 is also rotated in the rotational direction the same as that of the second rotation member 4 and at the rotational speed the same as that of the second rotation member 4.

As a result, the output member 9 coupled to the second rotation member 4 via the supporting axis 8d of the planet gear mechanism 8 is rotated. Accordingly, the output member 9 is rotated in the rotational direction the same as that of the input member 2 and at the rotational speed the same as that of the input member 2.

When the second rotation member 4 has been rotated, the first gear 8a is meshed with the second gear 8b and the third gear 8c and is rotated in the direction opposite to the rotational direction of the input member 2 while revolving in the rotational direction the same as that of the input member 2. Accordingly, the second gear 8b is rotated in the rotational direction the same as that of the input member 2 and at a speed higher than the rotational speed of the input member 2.

In this case, as shown in FIG. 4, the roller 7d of the second clutch mechanism 7 is arranged in the first gap 7f. The first gap 7f is wider than the diameter of the roller 7d, as described above. Accordingly, the third rotation member 6 to which the driving force has been input from the second gear 8b is rotated freely relative to the first rotation member 3 and does not inhibit the rotation of the second gear 8b.

Further, the driving force is hardly transmitted from the third rotation member 6 to the holder 7e via the roller 7d. Accordingly, the holder 7e hardly slides with respect to the second rotation member 4 and a state in which the driving force can be transmitted to the holder 7e from the second rotation member 4 is maintained, whereby the roller 7d and the holder 7e are rotated together with the second rotation member 4. Accordingly, the movement from the first gap 7f in the roller 7d is suppressed and the first rotation member 3 and the second rotation member 4 can be rotated substantially in the same manner.

Figure 7:
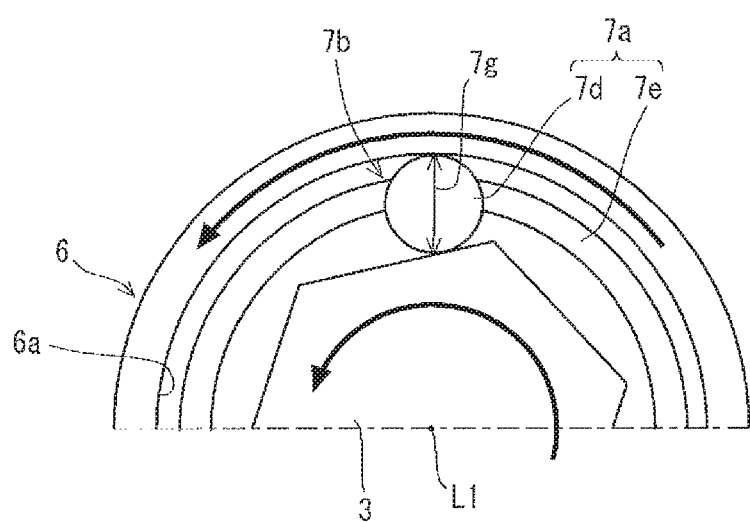
FIG. 7 is a diagram for describing operations of the second clutch mechanism when the drive transmission device according to the first embodiment switches from the first driving system to a second driving system.
Figure 8:
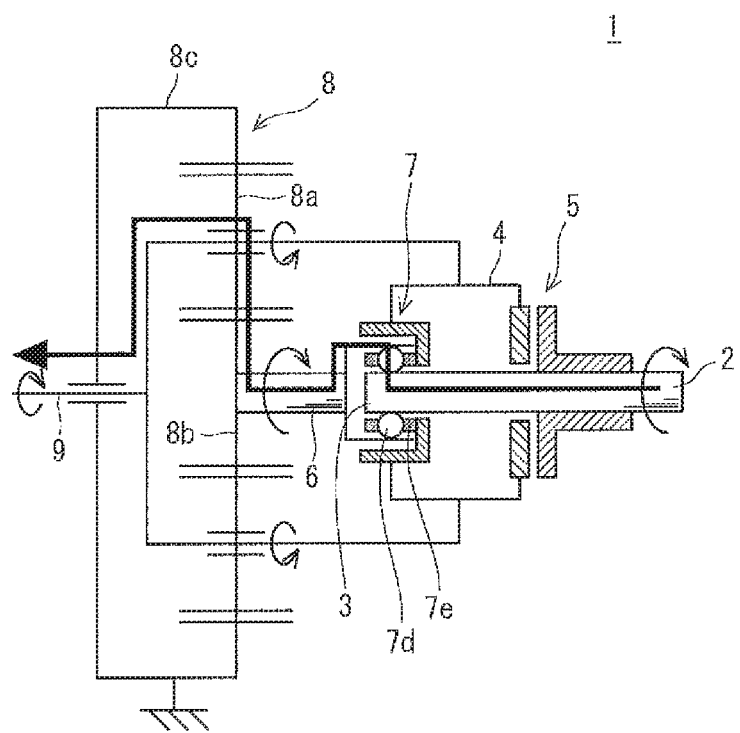
FIG. 8 is a skeleton diagram showing the second driving system in which the output member in the drive transmission device according to the first embodiment is rotated at a speed lower than the rotational speed of the input member.

Next, operations of the drive transmission device 1 when the load is applied to the output member 9 and the first driving system is switched to the second driving system will be described. FIG. 7 is a diagram for describing operations of the second clutch mechanism when the drive transmission device according to this embodiment switches from the first driving system to the second driving system. FIG. 8 is a skeleton diagram showing the second driving system in which the output member in the drive transmission device according to this embodiment is rotated at a speed lower than the rotational speed of the input member. In FIG. 8, the second driving system is indicated by an arrow.

When the load is applied to the output member 9 and the driving force transmitted from the second rotation member 4 to the first rotation member 3 is equal to or larger than the predetermined first driving force, at least one of the side surface of the recessed part 2d of the input member 2 and the friction plate 5b, and the friction plate 5b and the reaction plate 5a provided in the second rotation member 4 slides, the rotational speed of the second rotation member 4 becomes lower than the rotational speed of the first rotation member 3, and the first rotation member 3 and the second rotation member 4 are rotated relative to each other. Accordingly, as shown in FIG. 7, the roller 7d of the second clutch mechanism 7 is moved toward the second gap 7g in such a way that it approaches the corner part of the first rotation member 3. The roller 7d is meshed between the outer peripheral surface of the first rotation member 3 and the inner peripheral surface of the recessed part 6a of the third rotation member 6, and, as shown in FIG. 8, the driving force is transmitted from the first rotation member 3 to the third rotation member 6, whereby the second gear 8b is rotated. That is, the first clutch mechanism 5 switches the first driving system to the second driving system.

In this case, since the surface between one corner part of the first rotation member 3 and the other corner part thereof is a flat surface and the inner peripheral surface of the recessed part 6a of the third rotation member 6 is a circumferential surface, the roller 7d is moved smoothly from the first gap 7f toward the second gap 7g and is meshed between the outer peripheral surface of the first rotation member 3 and the inner peripheral surface of the recessed part 6a of the third rotation member 6 by a so-called wedge effect.

The position where the roller 7d is meshed between the outer peripheral surface of the first rotation member 3 and the inner peripheral surface of the recessed part 6a of the third rotation member 6 may not match the second gap 7g like in the case of this embodiment. In a position in which the gap between the contact on the outer peripheral surface of the first rotation member 3 with the roller 7d and the contact on the inner peripheral surface of the recessed part 6a of the third rotation member 6 with the roller 7d is narrower than the diameter of the roller 7d, the roller 7d is meshed between the outer peripheral surface of the first rotation member 3 and the inner peripheral surface of the recessed part 6a of the third rotation member 6.

The first gear 8a meshed with the second gear 8b and the third gear 8c is revolved in the rotational direction the same as that of the input member 2 while rotating in the direction opposite to the rotational direction of the input member 2. Accordingly, when the number of teeth of the third gear 8c is denoted by Zi1 and the number of teeth of the second gear 8b is denoted by Zs1, the output member 9 coupled to the first gear 8a via the supporting axis 8d of the planet gear mechanism 8 is rotated in the rotational direction the same as that of the input member 2 and at the rotational speed reduced to Zs1/(Zs1+Zi1) with respect to the rotational speed of the input member 2.

In this case, the second rotation member 4 is twisted upon receiving the driving force transmitted from the first rotation member 3 via the second clutch mechanism 7 and the driving force in association with the revolution of the first gear 8a transmitted from the planet gear mechanism 8. However, the holder 7e is slid with respect to the second rotation member 4 and suppresses the twist of the second rotation member 4. Accordingly, the rotation of the second rotation member 4 by the second driving system, and further the rotation of the first gear 8a are not inhibited. Accordingly, the aforementioned second driving force may be set to a value that causes the first gear 8a to appropriately rotate by the second driving system.

According to the aforementioned drive transmission device 1, when the first rotation member 3 and the second rotation member 4 are rotated relative to each other, the roller 7d moves in the transmission member moving part 7b and the first driving system is switched to the second driving system. In this case, since the width of the transmission member moving part 7b becomes small around the rotation axis L1, the transmission member moving part 7b moves the roller 7d from the first gap 7f toward the second gap 7g by a low relative rotation of the first rotation member 3 and the second rotation member 4 and the first driving system can be rapidly switched to the second driving system. It is therefore possible to suppress the rotation angle error between the first rotation member 3, which is the rotation member on the input side of the second clutch mechanism 7, and the third rotation member 6, which is the rotation member on the output side of the second clutch mechanism 7. By reducing the gap from the roller 7d in the first gap 7f, the first driving system can be switched to the second driving system more rapidly. In the aforementioned drive transmission device 1, when the driving force transmitted from the second rotation member 4 to the first rotation member 3 becomes smaller than the predetermined first driving force, the side surface of the recessed part 2d of the input member 2 and the friction plate 5b, and the friction plate 5b and the reaction plate 5a provided in the second rotation member 4 hardly slide again in the first clutch mechanism 5, and the third rotation member 6 is rotated in the direction the same as the rotational direction of the first rotation member 3 and at a speed higher than the rotational speed of the first rotation member 3. In this case, the roller 7d is pressed by the inner peripheral surface of the recessed part 6a of the third rotation member 6 and is moved toward the first gap 7f in such a way that it approaches the center between one corner part on the outer peripheral surface of the first rotation member 3 and the other corner part thereof. Accordingly, in the second clutch mechanism 7, the holder 7e is again coupled to the second rotation member 4, the third rotation member 6 is rotated freely relative to the first rotation member 3, and the first rotation member 3 and the second rotation member 4 can be rotated substantially in the same manner.

While the first clutch mechanism 5 according to this embodiment is configured in such a way that the first driving system is automatically switched to the second driving system when a driving force equal to or larger than the predetermined first driving force is transmitted from the second rotation member 4 to the input member 2, a clutch such as an electromagnetic clutch that is externally controllable may be used.

Second Embodiment

While the outer shape of the end part of the first rotation member 3 is the polygonal shape and the inner shape of the recessed part 6a of the third rotation member 6 is the circular shape in the first embodiment, this is not the only example.

Figure 9:
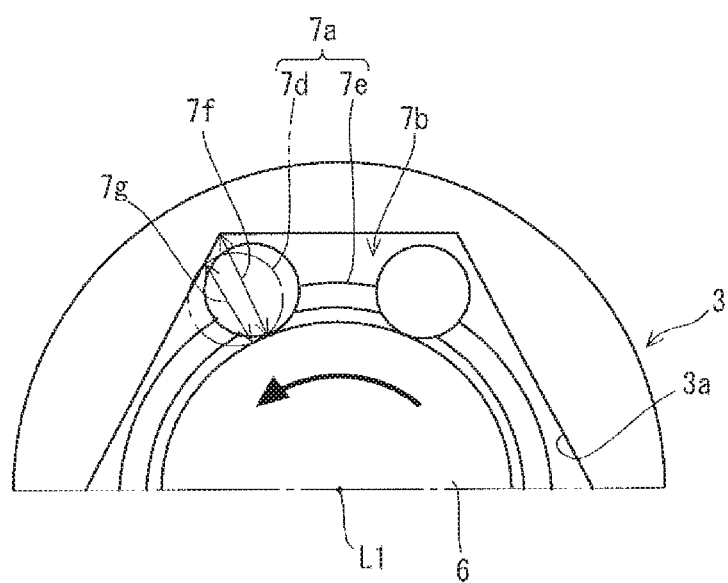
FIG. 9 is a cross-sectional view schematically showing a fitting part of a first rotation member and a third rotation member in a drive transmission device according to a second embodiment.

As shown in FIG. 9, a recessed part 3a may be formed in the first rotation member 3 and the end part of the third rotation member 6 may be inserted into the recessed part 3a. In this case, the inner shape of the recessed part 3a of the first rotation member 3 may be, for example, formed into a polygonal shape and the outer shape of the end part of the third rotation member 6 may be formed into a circular shape.

In the above case as well, the width of the transmission member moving part 7b becomes continuously narrower about the rotation axis L1. The first gap 7f is a gap between a predetermined position around the corner part of the inner peripheral surface of the recessed part 3a of the first rotation member 3 in the radial direction about the rotation axis L1 (in this embodiment, in the vicinity of the corner part) and the outer peripheral surface of the third rotation member 6. The first gap 7f has a width in the radial direction about the rotation axis L1 that does not substantially contact the inner peripheral surface of the recessed part 3a of the first rotation member 3 in a state in which the roller 7d contacts the outer peripheral surface of the third rotation member 6.

The second gap 7g is a gap between a predetermined position between one corner part of the inner peripheral surface in the recessed part 3a of the first rotation member 3 and another corner part thereof in the radial direction about the rotation axis L1 and the outer peripheral surface of the third rotation member 6 and the width of the radial direction about the rotation axis L1 is equal to or smaller than the diameter of the roller 7d.

In the aforementioned drive transmission device as well, when the first rotation member 3 and the second rotation member 4 are rotated relative to each other, the roller 7d is moved in the transmission member moving part 7b and the first driving system is switched to the second driving system. In this case, since the width of the transmission member moving part 7b becomes narrow about the rotation axis L1, the roller 7d is moved from the first gap 7f toward the second gap 7g by a low relative rotation of the first rotation member 3 and the second rotation member 4 and the first driving system can be rapidly switched to the second driving system. Accordingly, it is possible to suppress the rotation angle error between the first rotation member 3, which is the rotation member on the input side of the second clutch mechanism 7, and the third rotation member 6, which is the rotation member on the output side of the second clutch mechanism 7.

Third Embodiment

Figure 10:
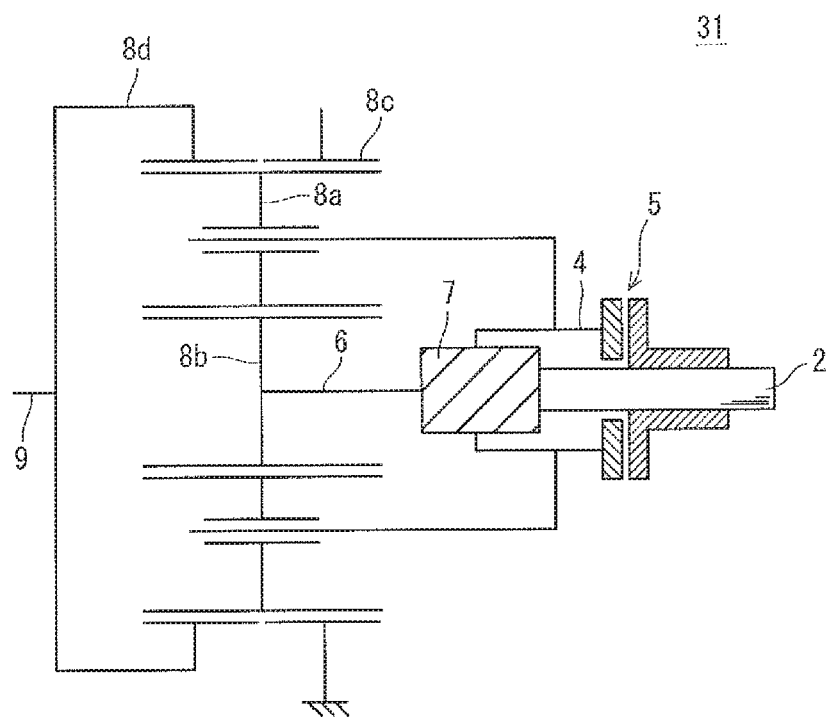
FIG. 10 is a skeleton diagram of a drive transmission device according to a third embodiment.

While the planet gear mechanism 8 according to the first embodiment is configured to include the first gear 8a, which is the planet gear, the second gear 8b, which is the sun gear, and the third gear 8c, which is the fixed ring gear, the planet gear mechanism 8 may be constituted as a paradox planet gear mechanism. FIG. 10 is a skeleton diagram of a drive transmission device according to this embodiment. In the following description, the overlapping descriptions as the first embodiment will be omitted and the components the same as those in the first embodiment will be denoted by the same reference symbols. Further, the second clutch mechanism 7 shown in FIG. 10 is simplified.

As shown in FIG. 10, a planet gear mechanism 31 according to this embodiment includes, besides the first gear 8a, the second gear 8b, and the third gear 8c, a fourth gear 8d. The fourth gear 8d is a ring gear and is meshed with the first gear 8a. Then the output member 9 is coupled to the fourth gear 8d. In this example, the output member 9 according to this embodiment is not coupled to the second rotation member 4.

In the drive transmission device that uses the planet gear mechanism 31, when the number of teeth of the fourth gear 8d is denoted by Zi3, in a case in which the first clutch mechanism 5 has selected the first driving system, the output member 9 is rotated in the rotational direction the same as that of the input member 2 and at the rotational speed of $(Zi3-Zi1)/Zi3$ with respect to the rotational speed of the input member 2. On the other hand, when the first clutch mechanism 5 has selected the second driving system, the output member 9 is rotated in the rotational direction the same as that of the input member 2 and at the rotational speed of $Zs1(Zi3-Zi1)/(Zi3(Zi1+Zs1))$ with respect to the rotational speed of the input member 2. As described above, in either the first driving system or the second driving system, the drive transmission device according to this embodiment is able to change the rotational speed of the outer member 9 with respect to the rotational speed of the input member 2.

Fourth Embodiment

Figure 11:
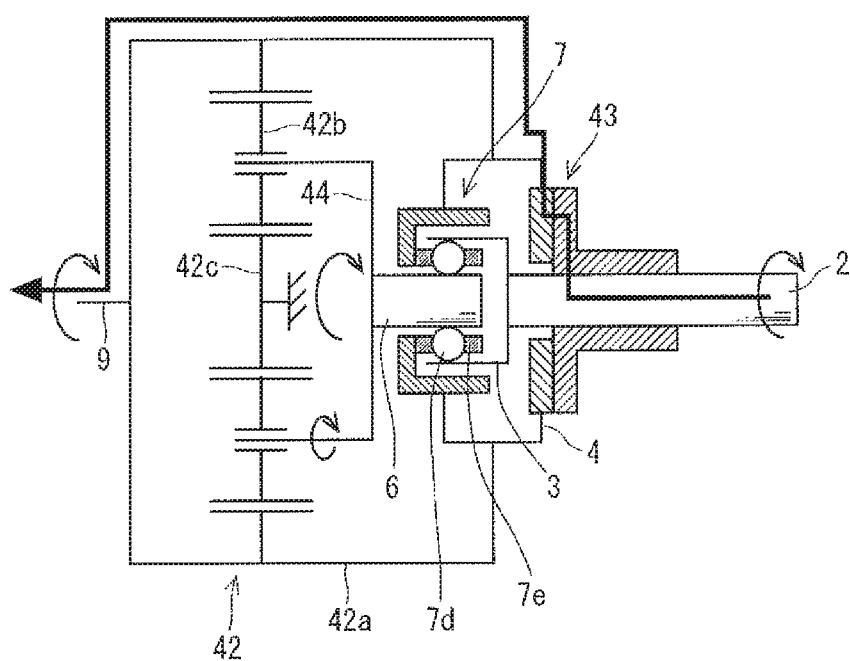
FIG. 11 is a skeleton diagram showing a first driving system in which an input member and an output member in a drive transmission device according to a fourth embodiment are rotated at the same speed.
Figure 12:
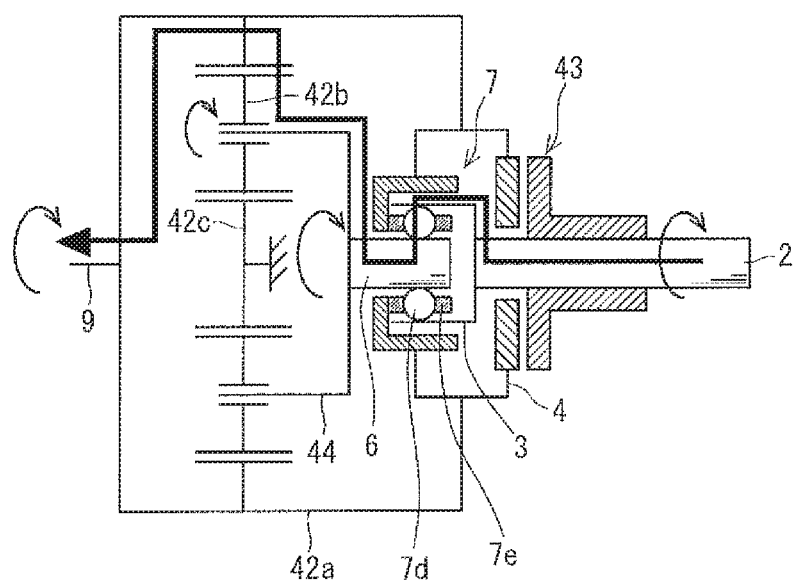
FIG. 12 is a skeleton diagram showing a second driving system in which the output member in the drive transmission system according to the fourth embodiment is rotated at a speed higher than the rotational speed of the input member.

A drive transmission device according to this embodiment is configured to be able to switch the first driving system in which the input member and the output member are rotated at the same speed and the second driving system in which the output member is rotated at a speed higher than the rotational speed of the input member. FIG. 11 is a skeleton diagram showing the first driving system in which the input member and the output member in the drive transmission device according to this embodiment are rotated at the same speed. FIG. 12 is a skeleton diagram showing the second driving system in which the output member in the drive transmission device according to this embodiment is rotated at a speed higher than the rotational speed of the input member. In the following description, the overlapping descriptions as the aforementioned embodiments are omitted and the components the same as those in the aforementioned embodiments will be denoted by the same reference symbols. Further, in FIGS. 11 and 12, each driving system is indicated by an arrow.

In a drive transmission device 41 according to this embodiment, as shown in FIGS. 11 and 12, similar to the second embodiment, the end part of the third rotation member 6 is inserted into the recessed part 3a of the first rotation member 3. A planet gear mechanism 42 according to this embodiment includes a first gear 42a, a second gear 42b, and a third gear 42c and is configured to be able to serve as a so-called solar-type planet gear mechanism. Further, a first clutch mechanism 43 according to this embodiment employs a controllable clutch mechanism such as an electromagnetic clutch.

The first gear 42a is a ring gear coupled to the second rotation member 4 and is coupled to the output member 9. The second gear 42b is a planet gear rotatably coupled to the third rotation member 6 via a carrier 44 and is meshed with the first gear 42a. The third gear 42c is a sun gear fixed to the housing 10 and is meshed with the second gear 42b.

Next, operations of the drive transmission device 41 according to this embodiment will be described. First, operations of the drive transmission device 41 in a case in which the input member 2 and the output member 9 are rotated at the same speed will be described.

When the first clutch mechanism 43 has selected the first driving system, as shown in FIG. 11, the driving force is transmitted from the input member 2 to the second rotation member 4, which causes the second rotation member 4 to be rotated. As a result, the output member 9 is rotated in the rotational direction the same as that of the input member 2 and at the rotational speed the same as that of the input member 2 via the first gear 42a coupled to the second rotation member 4.

At this time, the first rotation member 3 coupled to the input member 2 is also rotated in the rotational direction the same as that of the second rotation member 4 and at the rotational speed the same as that of the input member 2. Further, the second gear 42b is meshed with the first gear 42a and is revolved in the rotational direction the same as that of the input member 2 and at a speed lower than the rotational speed of the input member 2 while it is rotated in the rotational direction the same as that of the input member 2. The second clutch mechanism 7 rotates the third rotation member 6 to which the driving force has been transmitted from the second gear 42b freely relative to the first rotation member 3 and rotates the first rotation member 3 and the second rotation member 4 substantially in the same manner.

Next, operations of the drive transmission device 41 when the output member is rotated at a speed higher than the rotational speed of the input member will be described.

When the first clutch mechanism 43 has switched the first driving system to the second driving system, the rotational speed of the second rotation member 4 becomes lower than the rotational speed of the first rotation member 3, and the first rotation member 3 and the second rotation member 4 are rotated relative to each other. Accordingly, the roller 7d of the second clutch mechanism 7 is moved toward the second gap 7g in such a way that the roller 7d approaches the center of one corner part on the inner peripheral surface of the recessed part 3a of the first rotation member 3 and the other corner part thereof and the roller 7d is meshed between the inner peripheral surface of the recessed part 3a of the first rotation member 3 and the outer peripheral surface of the third rotation member 6.

As a result, as shown in FIG. 12, the driving force is transmitted from the first rotation member 3 to the third rotation member 6, and the second gear 42b is revolved in the rotational direction the same as that of the input member 2 and at the rotational speed the same as that of the input member 2 while it is rotated in the rotational direction the same as that of the input member 2. When the number of teeth of the first gear 42a is denoted by Zi4 and the number of teeth of the third gear 42c is denoted by Zs4, the output member 9 is rotated in the rotational direction the same as that of the input member 2 and at the rotational speed increased to (Zs4+Zi4)/Zs4 with respect to the rotational speed of the input member 2 via the first gear 42a meshed with the second gear 42b.

In this case, the second rotation member 4 is twisted upon receiving the driving force transmitted from the first rotation member 3 via the second clutch mechanism 7 and the driving force in association with the rotation of the first gear 42a transmitted from the planet gear mechanism 42. However, the holder 7e is slid with respect to the second rotation member 4 and suppresses the twist of the second rotation member 4. Accordingly, the rotation of the second rotation member 4 by the second driving system, and further the rotation of the first gear 42a are not inhibited.

In the aforementioned drive transmission device 41 according to this embodiment, when the first clutch mechanism 43 switches from the first driving system to the second driving system, the output member can be rotated at a speed higher than the rotational speed of the input member while the rotation angle error between the first rotation member 3 and the third rotation member 6 is being suppressed.

Fifth Embodiment

Figure 13:
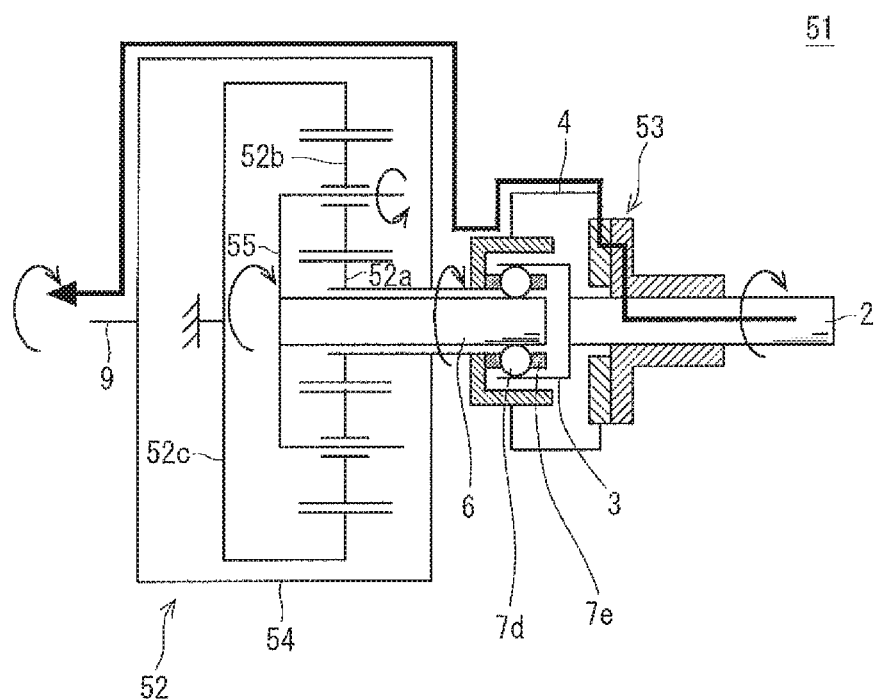
FIG. 13 is a skeleton diagram showing a first driving system in which an input member and an output member in a drive transmission device according to a fifth embodiment are rotated at the same speed.
Figure 14:
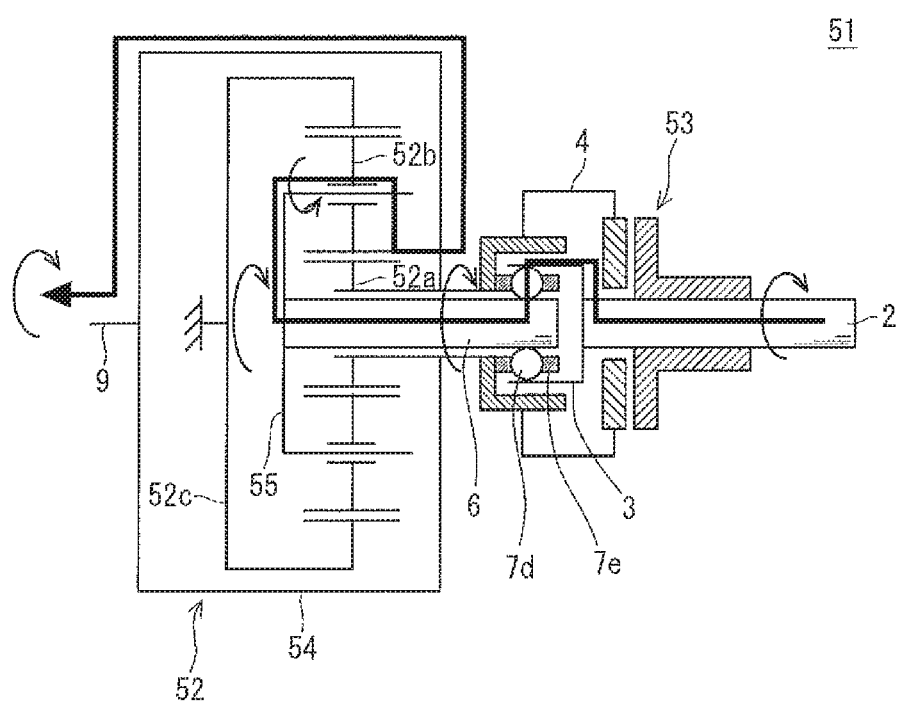
FIG. 14 is a skeleton diagram showing a second driving system in which the output member in the drive transmission device according to the fifth embodiment is rotated at a speed higher than the rotational speed of the input member.

A drive transmission device according to this embodiment is also configured to be able to switch the first driving system in which the input member and the output member are rotated at the same speed and the second driving system in which the output member is rotated at a speed higher than the rotational speed of the input member. FIG. 13 is a skeleton diagram showing the first driving system in which the input member and the output member in the drive transmission device according to this embodiment are rotated at the same speed. FIG. 14 is a skeleton diagram showing the second driving system in which the output member in the drive transmission device according to this embodiment is rotated at a speed higher than the rotational speed of the input member. In the following description, the overlapping descriptions as the aforementioned embodiments are omitted and the components the same as those in the aforementioned embodiments will be denoted by the same reference symbols. Further, in FIGS. 13 and 14, each driving system is indicated by an arrow.

In a drive transmission device 51 according to this embodiment, as shown in FIGS. 13 and 14, similar to the fourth embodiment, the end part of the third rotation member 6 is inserted into the recessed part 3a of the first rotation member 3. The planet gear mechanism 52 according to this embodiment includes a first gear 52a, a second gear 52b, and a third gear 52c and is configured to be able to serve as a so-called planetary-type planet gear mechanism. Further, a first clutch mechanism 53 according to this embodiment employs a controllable clutch mechanism such as an electromagnetic clutch.

The first gear 52a is a sun gear coupled to the second rotation member 4. The second rotation member 4 is coupled to the output member 9 via a first carrier 54. The second gear 52b is a planet gear rotatably coupled to the third rotation member 6 via a second carrier 55 and is meshed with the first gear 52a. The third gear 52c is a ring gear fixed to the housing 10 and is meshed with the second gear 52b.

Next, operations of the drive transmission device 51 according to this embodiment will be described. First, operations of the drive transmission device 51 of a case in which the input member 2 and the output member 9 are rotated at the same speed will be described.

When the first clutch mechanism 53 has selected the first driving system, the driving force is transmitted from the input member 2 to the second rotation member 4, which causes the second rotation member 4 to be rotated. As a result, the output member 9 is rotated in the rotational direction the same as that of the input member 2 and at the rotational speed the same as that of the input member 2 via the first carrier 54 coupled to the second rotation member 4.

In this case, the first rotation member 3 coupled to the input member 2 is also rotated in the rotational direction the same as that of the second rotation member 4 and at the rotational speed the same as that of the input member 2. Further, the second gear 52b is meshed with the first gear 52a and is revolved in the rotational direction the same as that of the input member 2 and at a speed lower than the rotational speed of the input member 2 while it is rotated in the direction opposite to the rotational direction of the input member 2. The second clutch mechanism 7 rotates the third rotation member 6 to which the driving force has been transmitted from the second gear 52b via the second carrier 55 freely relative to the first rotation member 3 and rotates the first rotation member 3 and the second rotation member 4 substantially in the same manner.

Next, operations of the drive transmission device 51 when the output member is rotated at a speed higher than the rotational speed of the input member will be described.

When the first clutch mechanism 53 has switched the first driving system to the second driving system, the rotational speed of the second rotation member 4 becomes lower than the rotational speed of the first rotation member 3, and the first rotation member 3 and the second rotation member 4 are rotated relative to each other. Accordingly, the roller 7d of the second clutch mechanism 7 is moved toward the second gap 7g in such a way that the roller 7d approaches the center of one corner part on the inner peripheral surface of the recessed part 3a of the first rotation member 3 and another corner part, whereby the roller 7d is meshed between the inner peripheral surface of the recessed part 3a of the first rotation member 3 and the outer peripheral surface of the third rotation member 6.

As a result, the driving force is transmitted from the first rotation member 3 to the third rotation member 6 and the second gear 52b is revolved in the rotational direction the same as that of the input member 2 and at the rotational speed the same as that of the input member 2 while it is rotated in the direction opposite to the rotational direction of the input member 2. When the number of teeth of the first gear 52a is denoted by Zs5 and the number of teeth of the third gear 52c is denoted by Zi5, the first gear 52a meshed with the second gear 52b is rotated in the rotational direction the same as that of the input member 2 at the rotational speed of (Zs5+Zi5)/Zs5 with respect to the rotational speed of the input member 2. Accordingly, it is possible to rotate the output member 9 in the rotational direction the same as that of the input member 2 and at a speed higher than the rotational speed of the input member 2.

At this time, the second rotation member 4 is twisted upon receiving the driving force transmitted from the first rotation member 3 via the second clutch mechanism 7 and the driving force in association with the rotation of the first gear 52a transmitted from the planet gear mechanism 52. However, the holder 7e is slid with respect to the second rotation member 4 and suppresses the twist of the second rotation member 4. Accordingly, the rotation of the second rotation member 4 by the second driving system, and further the rotation of the first gear 52a are not inhibited.

In the aforementioned drive transmission device 51 according to this embodiment as well, when the first clutch mechanism 53 switches the first driving system to the second driving system, the output member can be rotated at a speed higher than the rotational speed of the input member while the rotation angle error between the first rotation member 3 and the third rotation member 6 is being suppressed.

Sixth Embodiment

Figure 15:
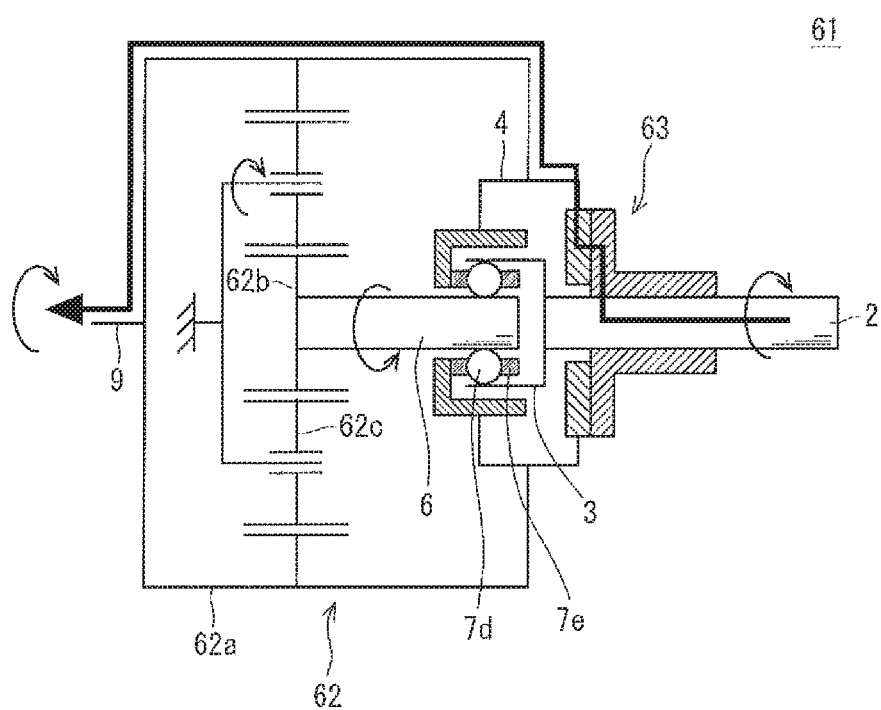
FIG. 15 is a skeleton diagram showing a first driving system in which an input member and an output member are rotated in the same direction in a drive transmission device according to a sixth embodiment.
Figure 16:
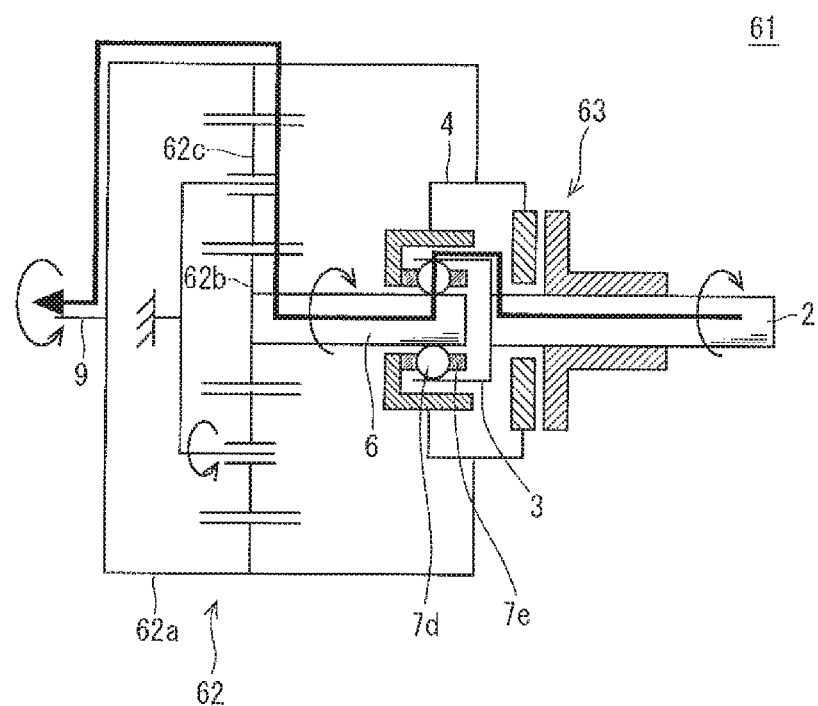
FIG. 16 is a skeleton diagram showing a second driving system in which the output member in the drive transmission device according to the sixth embodiment is rotated in the direction opposite to the rotational direction of the input member.

A drive transmission device according to this embodiment is configured to be able to switch the first driving system in which the input member and the output member are rotated in the same direction and the second driving system in which the output member is rotated in the direction opposite to the rotational direction of the input member. FIG. 15 is a skeleton diagram showing the first driving system in which the input member and the output member in the drive transmission device according to this embodiment are rotated in the same direction. FIG. 16 is a skeleton diagram showing the second driving system in which the output member in the drive transmission device according to this embodiment is rotated in the direction opposite to the rotational direction of the input member. In the following description, the overlapping descriptions as the aforementioned embodiments are omitted and the components the same as those in the aforementioned embodiments will be denoted by the same reference symbols. Further, in FIGS. 15 and 16, each driving system is indicated by an arrow.

In a drive transmission device 61 according to this embodiment, as shown in FIGS. 15 and 16, similar to the fourth embodiment, the end part of the third rotation member 6 is inserted into the recessed part 3a of the first rotation member 3. A planet gear mechanism 62 according to this embodiment includes a first gear 62a, a second gear 62b, and a third gear 62c and is configured to be able to serve as a so-called star-shaped planet gear mechanism. Further, a first clutch mechanism 63 according to this embodiment employs a controllable clutch mechanism such as an electromagnetic clutch.

The first gear 62a is a ring gear coupled to the second rotation member 4 and is coupled to the output member 9. The second gear 62b is a sun gear coupled to the third rotation member 6. The third gear 62c is a planet gear rotatably fixed to the housing 10 and is meshed with the first gear 62a and the second gear 62b.

Next, operations of the drive transmission device 61 according to this embodiment will be described. First, operations of the drive transmission device 61 when the input member 2 and the output member 9 are rotated in the same direction will be described.

When the first clutch mechanism 63 has selected the first driving system, the driving force is transmitted from the input member 2 to the second rotation member 4, which causes the second rotation member 4 to be rotated. As a result, the output member 9 coupled to the second rotation member 4 via the first gear 62a is rotated in the rotational direction the same as that of the input member 2 and at the rotational speed the same as that of the input member 2.

In this case, the first rotation member 3 coupled to the input member 2 is also rotated in the rotational direction the same as that of the second rotation member 4 and at the rotational speed the same as that of the input member 2. Further, while the second gear 62b is meshed with the first gear 62a via the third gear 62c and is rotated in the direction opposite to the rotational direction of the input member 2, the second clutch mechanism 7 rotates the third rotation member 6 to which the driving force has been transmitted from the second gear 62b freely relative to the first rotation member 3 and rotates the first rotation member 3 and the second rotation member 4 substantially in the same manner.

Next, operations of the drive transmission device 61 when the output member 9 is rotated in the direction opposite to the rotational direction of the input member 2 will be described.

When the first clutch mechanism 63 has switched the first driving system to the second driving system, the rotational speed of the second rotation member 4 becomes lower than the rotational speed of the first rotation member 3, and the first rotation member 3 and the second rotation member 4 are rotated relative to each other. Accordingly, the roller 7d of the second clutch mechanism 7 is moved toward the second gap 7g in such a way that the roller 7d approaches the center of one corner part on the inner peripheral surface of the recessed part 3a of the first rotation member 3 and another corner part and the roller 7d is meshed between the inner peripheral surface of the recessed part 3a of the first rotation member 3 and the outer peripheral surface of the third rotation member 6. As a result, the driving force is transmitted from the first rotation member 3 to the third rotation member 6, and the second gear 62b is rotated in the rotational direction the same as that of the input member 2 and at the rotational speed the same as that of the input member 2.

When the number of teeth of the first gear 62a is denoted by Zi6 and the number of teeth of the second gear 62b is denoted by Zs6, the first gear 62a meshed with the second gear 62b via the third gear 62c is rotated in the direction opposite to the rotational direction of the input member 2 and at the rotational speed of Zs6/Zi6 with respect to the rotational speed of the input member 2. As a result, the output member 9 can be rotated in the direction opposite to the rotational direction of the input member 2.

In this case, the second rotation member 4 is twisted upon receiving the driving force transmitted from the first rotation member 3 via the second clutch mechanism 7 and the driving force in association with the rotation of the first gear 62a transmitted from the planet gear mechanism 62. However, the holder 7e is slid with respect to the second rotation member 4 and suppresses the twist of the second rotation member 4. Accordingly, the rotation of the second rotation member 4 by the second driving system, and further the rotation of the first gear 62a are not inhibited.

In the aforementioned drive transmission device 61 according to this embodiment, when the first clutch mechanism 63 switches the first driving system to the second driving system, the output member can be rotated in the direction opposite to the rotational direction of the input member while the rotation angle error between the first rotation member 3 and the third rotation member 6 is being suppressed.

The present invention is not limited to the aforementioned embodiments and may be changed as appropriate without departing from the spirit of the present invention.

For example, another planet gear mechanism, a spur gear train, or a wave motion reducer may be arranged in the previous or subsequent stage of the planet gear mechanism.

For example, a plurality of stages of drive transmission devices according to the aforementioned embodiments may be coupled with each other.

While the drive transmission member has been constituted by the rollers in the aforementioned embodiments, the drive transmission member may be constituted by bearings. That is, the drive transmission member may be any member which can transmit the driving force from the first rotation member to the third rotation member due to a wedge effect in the fitting part of the first rotation member and the third rotation member.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A drive transmission device comprising:
    an input member to which a driving force is input;
    a first rotation member coupled to the input member;
    a second rotation member that is rotated about a rotation axis identical with a rotation axis about which the first rotation member is rotated;
    a first clutch mechanism that switches a first driving system in which the driving force is transmitted from the second rotation member and a second driving system in which the driving force is transmitted from the first rotation member;
    a third rotation member that is meshed with the first rotation member so that the third rotation member can be rotated about the rotation axis with respect to the first rotation member;
    a second clutch mechanism that causes the third rotation member to rotate freely relative to the first rotation member when the first clutch mechanism has selected the first driving system and transmits the driving force from the first rotation member to the third rotation member when the first clutch mechanism has selected the second driving system;
    a planet gear mechanism comprising a first gear that is coupled to the second rotation member and is rotated together with the second rotation member, a second gear that is coupled to the third rotation member and is rotated together with the third rotation member, and a third gear that has been fixed; and
    an output member that outputs a driving force output from the planet gear mechanism, wherein
    the second clutch mechanism comprises:
        a drive transmission member that is coupled to the second rotation member via a torque limiter and is arranged in a fitting part of the first rotation member with the third rotation member; and
        a transmission member moving part that includes a first gap and a second gap, the first gap being formed in a radial direction about the rotation axis in the fitting part and having a width in the radial direction wider than the thickness of the drive transmission member and the second gap being formed in the radial direction about the rotation axis in the fitting part and having a width in the radial direction equal to or smaller than the thickness of the drive transmission member, the transmission member moving part being formed in such a way that the width thereof becomes smaller from the first gap to the second gap around the rotation axis in the fitting part,
    when the first clutch mechanism has selected the first driving system, the drive transmission member is arranged in the first gap and the third rotation member to which the driving force is transmitted via the first gear and the second gear is rotated freely relative to the first rotation member and the drive transmission member is rotated together with the second rotation member via the torque limiter so that the first rotation member and the second rotation member are rotated in the same manner, and
    when the driving system has been switched from the first driving system to the second driving system due to an operation by the first clutch mechanism, the first rotation member and the second rotation member are rotated relative to each other, the drive transmission member is moved from the first gap toward the second gap to cause the drive transmission member to be meshed between the first rotation member and the third rotation member and the torque limiter cancels a coupling state between the drive transmission member and the second rotation member while transmitting the driving force from the first rotation member to the third rotation member.

2. The drive transmission device according to claim 1, wherein
    the drive transmission member comprises:

a roller that is extended in a direction of the rotation axis; and a holder that rotatably holds the roller and is coupled to the second rotation member via the torque limiter, an end part of the first rotation member is meshed with a recessed part formed in an end part of the third rotation member, an outer shape of the end part of the first rotation member is a polygonal shape, an inner shape of the recessed part of the third rotation member is a circular shape, the first gap is a gap between a predetermined position between one corner part of an outer peripheral surface in the end part of the first rotation member and another corner part thereof and an inner peripheral surface of the recessed part in the third rotation member and has a width in the radial direction larger than the diameter of the roller, and when the first clutch mechanism has selected the first driving system, the roller is arranged in the first gap, and the second gap is a gap between a predetermined position around a corner part of the outer peripheral surface in the end part of the first rotation member and the inner peripheral surface of the recessed part in the third rotation member and has a width in the radial direction equal to or smaller than the diameter of the roller, and when the first clutch mechanism has switched the first driving system to the second driving system, the roller is moved toward the second gap in such a way that the roller approaches the corner part in the end part of the first rotation member.

3. The drive transmission device according to claim 2, wherein the holder has a cylindrical shape and the first rotation member is inserted into the holder, and when the roller is meshed with the outer peripheral surface of the end part of the first rotation member and the inner peripheral surface of the recessed part of the third rotation member and the first gear is rotated via the second gear, the holder is meshed with the second rotation member in such a way that the holder is rotated freely relative to the second rotation member.

4. The drive transmission device according to claim 1, wherein the drive transmission member comprises:
    a roller that is extended in a direction of the rotation axis; and
    a holder that rotatably holds the roller and is coupled to the second rotation member via the torque limiter, an end part of the third rotation member is meshed with a recessed part formed in an end part of the first rotation member, an inner shape of the recessed part of the first rotation member is a polygonal shape, an outer shape of the end part of the third rotation member is a circular shape, the first gap is a gap between a predetermined position around a corner part of an inner peripheral surface in the recessed part of the first rotation member and an outer peripheral surface in the end part of the third rotation member has a width in the radial direction larger than the diameter of the roller, and when the first clutch mechanism has selected the first driving system, the roller is arranged in the first gap, and the second gap is a gap between a predetermined position between one corner part of the inner peripheral surface in the recessed part of the first rotation member and another corner part thereof and the outer peripheral surface in the end part of the third rotation member has a width in the radial direction equal to or smaller than the diameter of the roller, and when the first clutch mechanism has switched the first driving system to the second driving system, the roller is moved toward the second gap in such a way that the roller approaches an area between one corner part of the inner peripheral surface in the recessed part of the first rotation member and the other corner part thereof.

5. The drive transmission device according to claim 4, wherein the holder has a cylindrical shape and the third rotation member is inserted into the holder, and when the roller is meshed with the inner peripheral surface of the recessed part of the first rotation member and the outer peripheral surface of the end part of the third rotation member and the first gear is rotated via the second gear, the holder is meshed with the second rotation member in such a way that the holder is rotated freely relative to the second rotation member.

6. The drive transmission device according to claim 1, wherein the planet gear mechanism comprises a fourth gear, the first gear is a planet gear, the second gear is a sun gear meshed with the first gear, the third gear is a fixed ring gear that is meshed with the first gear, and the fourth gear is a ring gear that is meshed with the first gear and is coupled to the output member, the number of teeth of the fourth gear being different from that of the third gear.

* * * * *